United States Patent [19]
Brown et al.

[11] Patent Number: 5,465,626
[45] Date of Patent: Nov. 14, 1995

[54] PRESSURE SENSOR WITH STRESS ISOLATION PLATFORM HERMETICALLY SEALED TO PROTECT SENSOR DIE

[75] Inventors: Clem H. Brown, Scottsdale; David L. Vowles, Phoenix, both of Ariz.

[73] Assignee: Motorola, Inc., Schaumburg, Ill.

[21] Appl. No.: 223,062

[22] Filed: Apr. 4, 1994

[51] Int. Cl.$^6$ ................................................ G01L 9/06
[52] U.S. Cl. .................... 73/715; 73/706; 73/716; 73/721; 73/727; 73/754
[58] Field of Search ........................... 73/727, 754, 706, 73/715, 716, 721

[56] References Cited

U.S. PATENT DOCUMENTS

| | | | |
|---|---|---|---|
| 4,019,388 | 4/1977 | Hall, II et al. | 73/754 |
| 4,373,397 | 2/1983 | Keller | 73/721 |
| 4,726,233 | 2/1988 | Eckardt et al. | 73/727 |
| 4,776,218 | 10/1988 | Sawa et al. | 73/727 |
| 4,898,035 | 2/1990 | Yajima et al. | 73/727 |
| 5,060,520 | 10/1991 | Strasser | 73/715 |
| 5,089,445 | 2/1992 | Francis | 501/15 |
| 5,230,248 | 7/1993 | Cucci et al. | 73/715 |

FOREIGN PATENT DOCUMENTS

| | | | |
|---|---|---|---|
| 0427261 | 5/1991 | European Pat. Off. | 73/754 |
| 6177735 | 4/1986 | Japan | 73/754 |
| 4160332 | 6/1992 | Japan | 73/754 |

*Primary Examiner*—Hezron E. Williams
*Assistant Examiner*—George M. Dombroske
*Attorney, Agent, or Firm*—Edward J. Mischen; Robert D. Atkins

[57] ABSTRACT

An electronic pressure sensor (10) is enhanced by attaching a sensor die (18) to a stress isolation platform (12) using an adhesive (42) having a similar thermal coefficient of expansion. The adhesive provides a hermetic seal between the stress isolation platform and the pressure sensor die. A via (20) in the stress isolation platform provides an opening for pressure to be applied to the sensor die. The stress isolation platform is attached to a plastic package body (16) via a semi-rigid adhesive (40) for providing stress isolation and a hermetic seal between the package body and the stress isolation platform. Any hostile chemical entering the via contacts an exposed diaphragm (50) of the sensor die to assert pressure against its piezoelectric network (52) to generate the electrical signals representative of the applied pressure but are kept away from the sensitive interconnects by the hermetic seals.

15 Claims, 2 Drawing Sheets

PRESSURE SENSOR WITH STRESS ISOLATION PLATFORM HERMETICALLY SEALED TO PROTECT SENSOR DIE

BACKGROUND OF THE INVENTION

The present invention relates in general to pressure sensors and, more particularly, to an electronic pressure sensor with the sensing die protected from hostile environments by a hermetically sealed stress isolated platform.

By 1996, federal government regulations will require that automotive fuel system vapor pressure sensors be placed in every automobile and light truck sold in the United States. The petrochemical environment of a fuel system is extremely hostile. It is known that mechanical pressure sensors can be manufactured to be impervious to adverse chemical environments. However, the mechanical sensor is very expensive and characterized by a bulky metallic package with a strain gauge-piezoelectric sensor. The size and cost of such a sensor make it impractical for use in automotive applications.

Due to cost, size, and reliability advantages of integrated electronics, it is desirable to adapt electronic sensor technology to petrochemical environments in automobile applications. Electronic pressure sensors are used in ambient and atmospheric applications. However, adaptation of electronic pressure sensors to petrochemical environments presents new problems to the technology. One such problem lies in the integrity of the sensor associated interconnects. Present uses of electronic pressure sensors permit intimate contact between sensor wirebonds, package leads, and the sensed non-hostile pressure medium. Any contact with hostile chemicals has proven to cause premature failure of the sensor.

It is further desired to extend electronic pressure sensor technology to higher pressure applications involving gases. In this instance, the fragile nature of the sensing die and interconnects creates stress problems that often lead to untimely failure of the sensor.

Hence, a need exists for a low cost and reliable hermetically sealed pressure sensor that can be used in hostile chemical and pressure environments.

DETAILED DESCRIPTION OF THE PREFERRED EMBODIMENT

The present invention provides a hermetically sealed electronic pressure sensor for detecting a wide range of fluid or gas pressures and supplying an electrical signal representative of the applied pressure. A pressure sensitive semiconductor die is attached to a stress isolation platform using an adhesive that has a similar thermal coefficient of expansion and provides a hermetic seal between the platform and the sensor die. The stress isolation platform includes a via port that provides an opening for pressure to be applied to the semiconductor sensor die. The stress isolation platform is attached to a package body with a semi-rigid adhesive providing stress isolation and a hermetic seal between the plastic package body and the stress isolated platform. Subsequent electrical connections via wirebonds are made between the sensor die and the package leads to carry electrical signals to external connections on the package body.

The pressure sensor device is capable of sensing wide ranges of pressures from various types of fluids and gases, that are commonly considered to be hostile to the components of the sensor, without affecting reliability or performances of the device. Examples of such hostile chemicals include calcium chloride, copper, distilled water, ethyl alcohol, ethylene glycol, formic acid, hydraulic fluid, indolene, iso-octane, methanol, sodium chloride, nitric acid, sulfuric acid, t-butyl hydroperoxide, tert-butyl methyl ether, toluene, xylene, and zinc.

Figure 1:
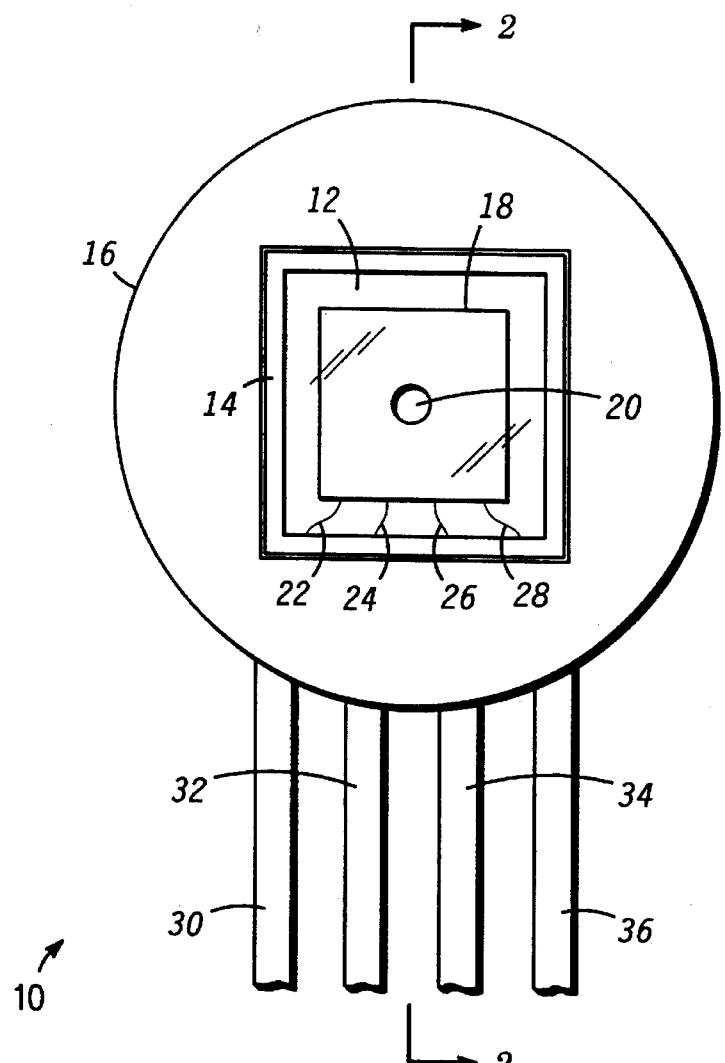
FIG. 1 illustrates a top view of a hermetically sealed electronic pressure sensor.

Referring to FIG. 1, a top view of pressure sensor 10 is shown including a stress isolation platform 12 peripherally mounted on edge 14 of package body 16. Sensor die 18 is mounted to the underside of stress isolating platform 12. Stress isolation platform 12 is shown as transparent so that edge 14 and sensor die 18 are visible from the top view. Via 20 located in the center of stress isolating platform 12 provides an opening for the external pressure to reach sensor die 18. Sensor die 18 is attached to stress isolated platform 12 with a glass bonding adhesive agent to provide a hermetic seal around via 20. Sensor die 18 senses a differential pressure between the pressure applied through via 20 and a reference pressure inside the cavity of package body 16. Sensor die 18 converts the sensed pressure to an electrical signal representative of the differential pressure across its body.

Package body 16 is molded from a novalac epoxy and provides a housing and electrical interconnect for sensor die 18. Other potential materials for package body 16 include organic epoxies, elastomers filled with inorganic matter, and ceramic that provide polar and non-polar chemical resistance. Bondwires 22, 24, 26, and 28 are preferably made of gold and attached to aluminum bonding pads on the underside of sensor die 18 using conventional integrated circuit bonding techniques. Bondwires 22, 24, 26 and 28 are further electrically coupled to package body copper leads 30, 32, 34 and 36, respectively.

Stress isolating platform 12 is composed of a material having a thermal coefficient of expansion similar to that of sensor die 18. Suitable materials for stress isolating platform 12 that provide stress isolation by matching thermal coefficients include borosilicate glass, various grades of alumina, cordierite, and steatite. Stress isolating platform 12 mounts on edge 14 of package body 16 using semi-rigid bonding adhesive agent 40 that hermetically seals the inner cavity of package body 16 to protect bonding wires 22–28 and a piezoelectric pressure sensing network (not shown in FIG. 1) located on the backside of sensor die 18 from hostile chemicals. Stress isolating platform 12 must also have non-porosity characteristics such that hermetic qualities are preserved while providing polar and non-polar chemical resistance. The material used to form stress isolating platform 12 preferably has the capability of molding or boring via 20.

Figure 2:
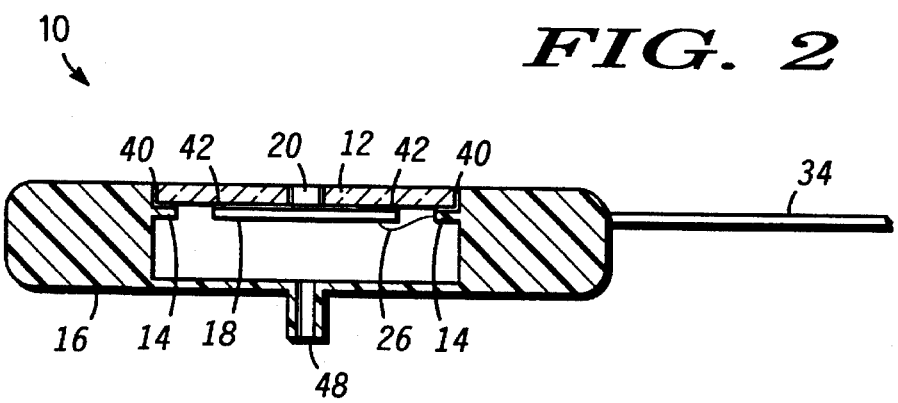
FIG. 2 illustrates a cross sectional view of the electronic pressure sensor of FIG. 1.

Turning to FIG. 2, a cross-sectional view of pressure sensor 10 is shown. A thermal adhesive agent 40 between stress isolating platform 12 and edge 14 provides stress isolation by allowing independent thermal expansion of package body 16 and provides polar and non-polar chemical resistance. Suitable materials for adhesive agent 40 that provide stress isolation by matching thermal coefficients include rigid and semi-rigid epoxy and elastomers. Sensor die 18 is attached to the underside of stress isolating platform 12 using glass bonding adhesive agent 42 around its perimeter. Adhesive 42 must also have non-porosity characteristics to maintain the hermetic seal and stress matching between stress isolating platform 12 and sensor die 18. Adhesive 42 is preferably a material such as lead titanate glass and various grades of lead borate glasses with thermal coefficients of expansion that are the same as sensor die 18 and stress isolating platform 12 while providing polar and non-polar chemical resistance.

Bondwire 26 in FIG. 2 is coupled between a conventional bond pad on the backside of sensor die 18 and package body lead 34. The backside of package body 16 includes a pressure inlet 48 open to the inner cavity of pressure sensor 10. Pressure inlet 48 is typically connected to an external reference pressure source. The external gauge pressure is applied against the backside of sensor die 18 so as to measure a differential pressure between that applied through via 20 and the pressure entering inlet 48.

Figure 3:
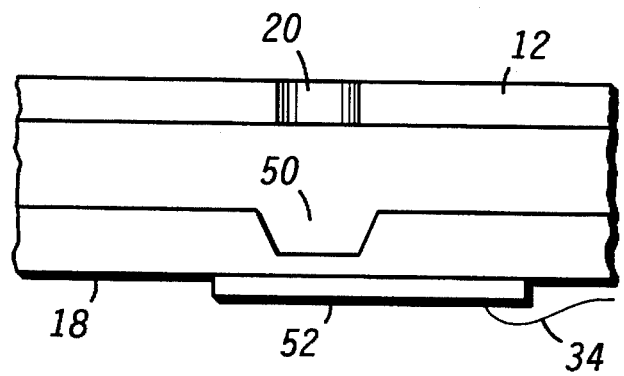
FIG. 3 illustrates further detail of sensor die of FIG. 2.

FIG. 3 illustrates further detail of sensor die 18. Sensor die 18 is made from silicon with one side micro-machined to provide transducer diaphragm 50. A piezoelectric pressure sensing network 52 is formed on the underside of sensor die 18. Transducer diaphragm 50 flexes upon application of a fluid or gaseous differential pressure causing a change in the resistance film of piezoelectric network 52 and results in a corresponding change in the current flow in the respective resistor. Current tap points or electrical connections are made along the resistive path of piezoelectric network 52. The electrical connections are defined at the juncture of the attachment point of bondwires 22–28 and sensor die 18 at conventional bond pads. The change in current flow appears as a potential difference on current taps of piezoelectric network 52. The current taps are electrically coupled via bondwires 22–28 to electrical package body leads 30–36, respectively.

Piezoelectric network 52 comprises an implanted transducer, thin-film deposited resistors, evaporated metallization, and aluminum evaporated bond pads. The transducer, resistors, and bond pads are interconnected using the aluminum metallization. The function of piezoelectric network 52 is to sense the flexing of transducer diaphragm 50 in response to the applied differential pressure and to provide a variable resistance path as a function of the applied differential pressure for the direct current induced by the voltage applied between two of the package body leads.

A key feature of the present invention is to protect piezoelectric network 52 and bondwires 22–28 and associated bonding pads from hostile chemicals introduced through via 20. The hermetic seal between edge 14 and stress isolation platform 12 using adhesive 40 and the hermetic seal between sensor die 18 and stress isolation platform 12 using adhesive 42 provide the needed isolation for piezoelectric network 52 and bondwires 22–28. The hostile chemicals entering via 20 contact diaphragm 50 to assert pressure against piezoelectric network 52 to generate the electrical signals as described above but are kept away from the sensitive interconnects by the hermetic seals.

Figure 4:
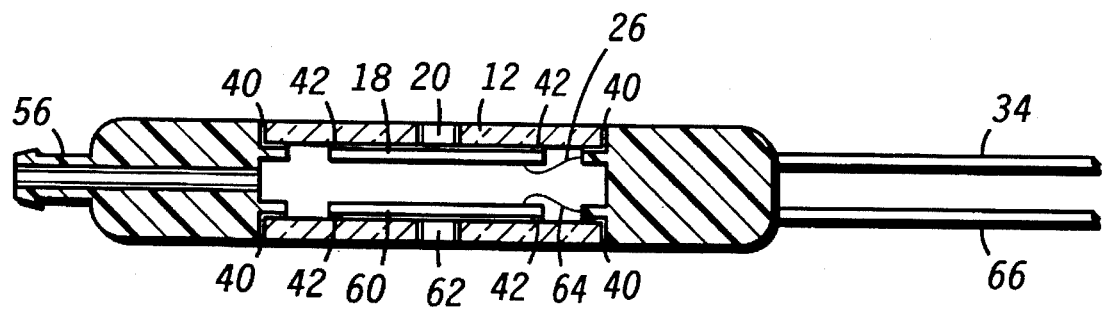
FIG. 4 illustrates an alternate embodiment with back-to-back pressure sensors receiving a common gauge pressure.

In FIG. 4, an alternate embodiment of the present invention is shown as a dual package pressure sensor with common gauge pressure inlet 56. Components with the same reference number perform a similar function as described in FIGS. 1–3. The pressure sensor package includes two complete back-to-back sensors die 18 and 60. Sensor die 60 is constructed and operates as described for sensor die 18. Inlet 56 provides a common external pressure to both sensor die 18 and 60. Each sensor die 18 and 60 measures the differential pressure between the common gauge pressure in the internal cavity and the pressure applied to respective vias 20 and 62. Sensor die 18 is coupled through bonding wire 26 to package lead 34 as described above. Sensor die 60 is coupled through bonding wire 64 to package lead 66 for providing a reading of the differential pressure across sensor die 60.

By now it should be appreciated that the pressure sensor includes a stress isolation platform hermetically sealed to the package for protecting the piezoelectric network and interconnects from harsh conditions. The pressure sensor package provides protection for the electronic pressure sensing die in many hostile environments including fuel systems, hydraulic systems, aggressive vapor and liquid chemicals such as cooling/heating systems, and chemicals that may be either polar, non-polar or combinations of both. A glass bonding agent adhesive with thermal coefficients of expansion that are the same as the sensor die and the stress isolating platform provide a hermetic seal and stress matching between the stress isolating platform and the sensor die. The via in the stress isolation platform provides access for pressure source to the sensor die. The pressure sensor package includes an inlet to gain access to the internal cavity of the cavity to establish the differential pressure. Alternatively, the sensor package may contain multiple sensor die sharing a common gauge pressure applied to the internal cavity through an inlet.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A pressure sensor, comprising:

a stress isolation platform with an opening for receiving a first pressure;

a sensor die mounted to said stress isolation platform with a first adhesive so as to receive said first pressure from said opening of said stress isolation platform, said sensor die, said stress isolation platform, and said first adhesive having similar thermal coefficients of expansion; and a package body having an edge for mounting said stress isolation platform with a second adhesive that forms a seal to protect said sensor die located within an inner cavity of said package body.

2. The pressure sensor of claim 1 wherein said package body includes a second opening for receiving a second pressure to establish a differential pressure across said sensor die.

3. The pressure sensor of claim 2 wherein said sensor die includes:

a transducer diaphragm that flexes in response to said differential pressure;

a piezoelectric network mounted to said transducer diaphragm that changes resistance in response to said flexing of said transducer diaphragm; and a plurality of bonding wires coupled between tap points of said piezoelectric network and conductive leads of said package body.

4. The pressure sensor of claim 3 wherein said first adhesive is made of lead titanate glass and various grades of lead borate glass.

5. The pressure sensor of claim 4 wherein said second adhesive is made of an epoxy that provides stress isolation by allowing independent thermal expansion of said package body.

6. A method of sealing a pressure sensor, comprising the steps of:

providing a stress isolation platform having thermal coefficient of expansion and having an opening for receiving a first pressure;

providing a sensor die having a thermal coefficient of expansion similar to said thermal coefficient of expansion of said stress isolation platform;

selecting a first adhesive having a coefficient of thermal expansion similar to said thermal coefficients of expansion of said sensor die and said stress isolation platform;

mounting said sensor die over said opening of said stress isolation platform with said first adhesive so as to receive said first pressure; and mounting said stress isolation platform on an edge of a package body with a second adhesive that forms a seal to protect said sensor die located within an inner cavity of said package body.

7. The method of claim 6 further including the step of providing a second opening in said package body for receiving a second pressure to establish a differential pressure across said sensor die.

8. The method of claim 7 further including the steps of:

providing a transducer diaphragm that flexes in response to said differential pressure;

providing a piezoelectric network mounted to said transducer diaphragm that changes resistance in response to said flexing of said transducer diaphragm; and providing a plurality of bonding wires coupled between tap points of said piezoelectric network and conductive leads of said package body.

9. The method of claim 8 wherein said first adhesive is made of lead titanate glass and various grades of lead borate glass.

10. The pressure sensor of claim 9 wherein said second adhesive is made of an epoxy that provides stress isolation by allowing independent thermal expansion of said package body.

11. A pressure sensor, comprising:

a first sensor die having first and second surfaces for sensing differential pressure between first and second pressures and having a thermal coefficient of expansion;

a stress isolation platform having an opening for receiving said first pressure, said stress isolation platform having a thermal coefficient of expansion similar to said thermal coefficient of expansion of said sensor die;

a first adhesive for mounting said first sensor die to said stress isolation platform so as to receive said first pressure from said opening of said stress isolation platform, said first adhesive having a thermal coefficient of expansion similar to said sensor die and said stress isolation platform;

a second sensor die having first and second surfaces for sensing differential pressure between said second pressure and a third pressure; and a package body for mounting said first and second sensor die with first and second openings for receiving said first and third pressures respectively, said package body further including a third opening for receiving said second pressure.

12. The pressure sensor of claim 11 wherein said package body includes an edge for mounting said stress isolation platform with a second adhesive that forms a seal to protect said sensor die located within an inner cavity of said package body.

13. The pressure sensor of claim 12 wherein said sensor die includes:

a transducer diaphragm that flexes in response to said differential pressure;

a piezoelectric network mounted to said transducer diaphragm that changes resistance in response to said flexing of said transducer diaphragm; and a plurality of bonding wires coupled between tap points of said piezoelectric network and conductive leads of said package body.

14. The pressure sensor of claim 13 wherein said first adhesive is made of lead titanate glass and various grades of lead borate glass.

15. The pressure sensor of claim 14 wherein said second adhesive is made of an epoxy that provides stress isolation by allowing independent thermal expansion of said package body.

* * * * *